(12) United States Patent
Daigle et al.

(10) Patent No.: US 9,079,503 B2
(45) Date of Patent: Jul. 14, 2015

(54) SYSTEMS AND METHODS FOR GENERATING POWER IN A VEHICLE

(75) Inventors: Jeffrey Daigle, Erie, PA (US); Bret Dwayne Worden, Union City, PA (US); Maksim Borisenko, Erie, PA (US)

(73) Assignee: General Electric Company, Schenectady, NY (US)

( * ) Notice: Subject to any disclaimer, the term of this patent is extended or adjusted under 35 U.S.C. 154(b) by 262 days.

(21) Appl. No.: 13/605,408

(22) Filed: Sep. 6, 2012

(65) Prior Publication Data

US 2014/0060378 A1 Mar. 6, 2014

(51) Int. Cl.
*B60L 11/02* (2006.01)
*B60L 11/18* (2006.01)
*B60L 15/00* (2006.01)

(52) U.S. Cl.
CPC .............. *B60L 11/02* (2013.01); *B60L 11/1801* (2013.01); *B60L 15/007* (2013.01); *B60L 2200/26* (2013.01); *Y02T 10/70* (2013.01); *Y02T 10/7005* (2013.01)

(58) Field of Classification Search
USPC ..................................................... 105/35, 49
See application file for complete search history.

(56) References Cited

U.S. PATENT DOCUMENTS

| | | | | |
|---|---|---|---|---|
| 5,334,878 A | * | 8/1994 | Vanek et al. ..................... | 307/64 |
| 7,891,302 B2 | * | 2/2011 | Bachman ......................... | 105/35 |
| 8,196,518 B2 | * | 6/2012 | Bachman ......................... | 105/35 |
| 8,421,266 B2 | * | 4/2013 | Kumar ............................ | 307/9.1 |
| 8,772,962 B2 | * | 7/2014 | Kumar ............................ | 307/9.1 |
| 2006/0025902 A1 | * | 2/2006 | Brown et al. .................... | 701/19 |
| 2007/0272116 A1 | * | 11/2007 | Bartley et al. ................... | 105/35 |
| 2011/0273009 A1 | * | 11/2011 | Kumar ............................ | 307/9.1 |
| 2014/0060378 A1 | * | 3/2014 | Daigle et al. .................... | 105/35 |
| 2014/0097696 A1 | * | 4/2014 | Kumar et al. ................... | 307/82 |

* cited by examiner

*Primary Examiner* — Jason C Smith
(74) *Attorney, Agent, or Firm* — GE Global Patent Operation; John A. Kramer (57) ABSTRACT

Various systems and method for generating electrical power in a rail vehicle are provided. In one embodiment, a vehicle system includes an electrical power generation unit operatively coupled with a drive shaft of an engine. The electrical power generation unit includes a traction alternator and a head-end-power (HEP) alternator. The traction alternator is excited by power electronics positioned external to the traction alternator. The HEP alternator is self-excited by an exciter winding positioned in the HEP alternator.

20 Claims, 5 Drawing Sheets

SYSTEMS AND METHODS FOR GENERATING POWER IN A VEHICLE

FIELD

Embodiments of the subject matter disclosed herein relate to systems and methods for generating electrical power in a vehicle.

BACKGROUND

In some trains, electrical power may be generated at one vehicle in the train and distributed to other vehicles of the train. For example, a locomotive or a generator car may include an alternator, referred to as a head-end-power (HEP) alternator, that distributes electrical power to other cars in the train. In a passenger train for example, the electrical power generated by a HEP alternator may be distributed to passenger cars for lighting, electrical, and other hotel needs of passengers. In one example, a HEP alternator in a rail vehicle is excited by power electronics (e.g., including a battery, permanent magnets, driver circuits) that are externally positioned from the HEP alternator in the rail vehicle.

In some cases, the external power electronics that provide excitation to the HEP alternator add additional overhead to a rail vehicle. For example, the external power electronics can increase the overall cost and weight of the rail vehicle. As another example, the external power electronics may require cooling by a cooling system. The cooling system increases fuel consumption of the rail vehicle, since additional fuel is burned to generate electrical power to operate the cooling system.

BRIEF DESCRIPTION OF THE INVENTION

In one embodiment, a vehicle system includes an electrical power generation unit operatively coupled with a drive shaft of an engine. The electrical power generation unit includes a traction alternator and a head-end-power (HEP) alternator. The traction alternator is excited by power electronics positioned external to the traction alternator. The HEP alternator is self-excited by an exciter winding positioned in the HEP alternator.

By employing a self-excited HEP alternator, external power electronics that would otherwise be required to excite the alternator may be eliminated from the rail vehicle. In this way, the HEP system may be made more compact and light weight relative to a configuration where a HEP alternator is excited by external power electronics.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

A train or other rail vehicle consist may include a plurality of rail vehicles interconnected with one another. (Generally, a consist is a group of vehicles that are mechanically linked to travel together along a route.) In some examples, one rail vehicle may generate electrical power and transmit the electrical power to other rail vehicles in the train. The present description relates to various embodiments of systems and methods for generating such electrical power in a rail vehicle. More particularly, the present description relates to a head-end-power or hotel-electric-power (HEP) alternator in a rail vehicle that is self-excited by a field winding positioned in the HEP alternator to provide electrical power to one or more other rail vehicles (such as rail cars) of a train or other rail vehicle consist. As used herein, a HEP alternator refers to an alternator that generates electrical power in a first rail vehicle that is transmitted to, and consumed by, electrical loads positioned in other rail vehicles that are mechanically coupled to, either directly or indirectly, the first rail vehicle in a train or other rail vehicle consist.

In one example, the field winding may be employed in the HEP alternator for excitation because the HEP alternator outputs a substantially constant electrical power output level to the rail cars (e.g., varying within less than 5% to 10% of the average power level). Since the electric power level is substantially constant, nominal control may be used to handle operation of the HEP alternator. By employing a self-excited HEP alternator, external power electronics that would otherwise excite the alternator may be eliminated from the rail vehicle, if desired. In this way, the HEP system may be made more compact and light weight relative to a configuration where a HEP alternator is excited by external power electronics.

In some embodiments, a traction alternator is coupled to a drive shaft of an engine and the HEP alternator is coupled to the drive shaft such that both alternators convert torque output from the engine into electrical power, with both alternators optionally housed in a common housing. The operation of the HEP alternator may be contrasted with a traction alternator, where the power output of the traction alternator varies significantly during operation depending on the traction motor requirements for driving the rail vehicle. Specifically, the traction alternator provides electrical power to one or more traction motors of the rail vehicle and the HEP alternator provides electrical power to one or more rail cars of the rail vehicle. The electrical power provided by the traction alternator may vary based on the changes in load (e.g., traction motor speed). On the other hand, as noted above, the HEP alternator may output a substantially constant electrical power output level.

Figure 1:
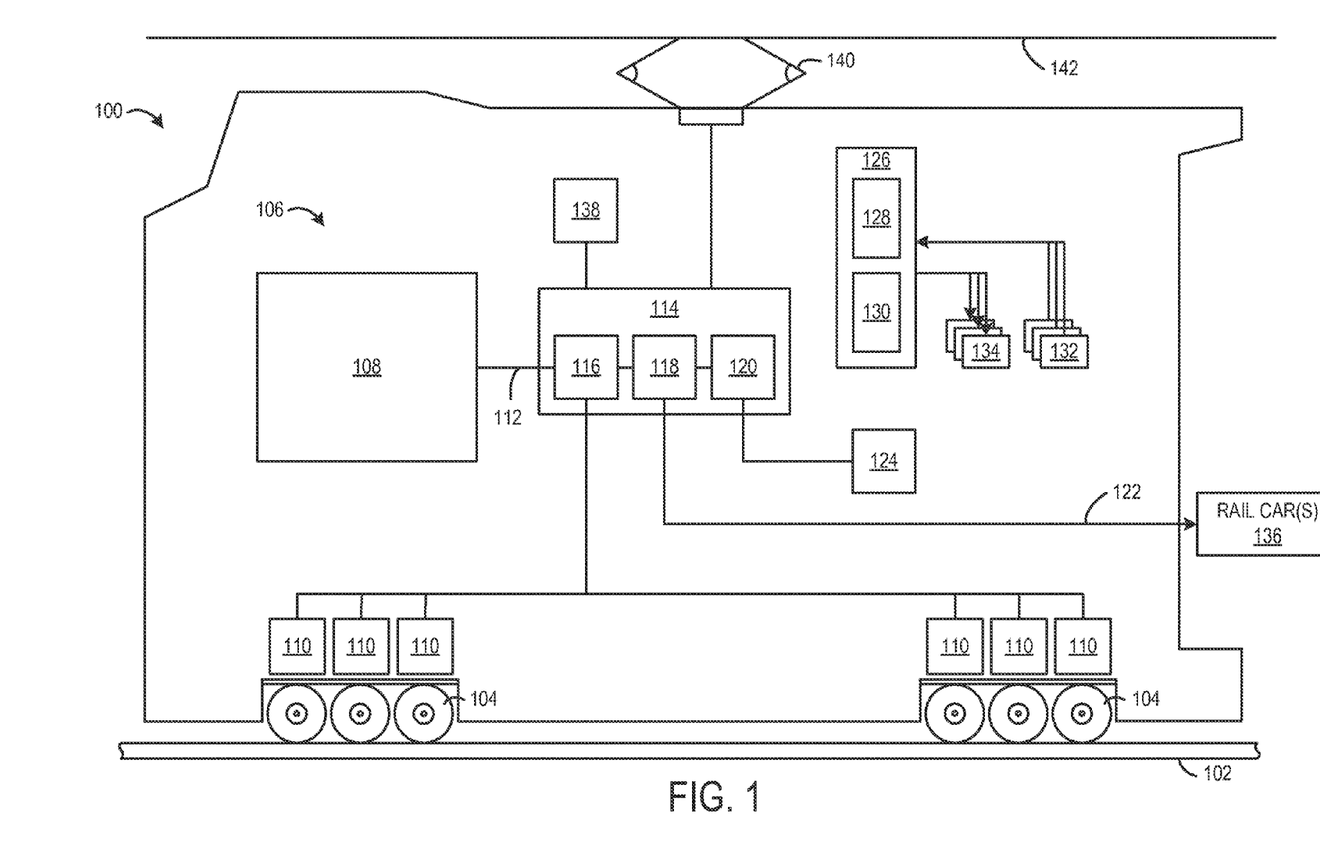
FIG. 1 shows a schematic diagram of an example of a rail vehicle according to an embodiment of the present disclosure.

FIG. 1 schematically shows an embodiment of a vehicle system 100, herein depicted as a rail vehicle, configured to run on a rail 102 using a plurality of wheels 104. In one example, the rail vehicle 100 is a locomotive. In another example, the rail vehicle 100 is a generator car that is not a locomotive. In one example, the vehicle system 100 may be coupled to a plurality of rail cars 136 that are connected to form a train. In one example, the train may be a passenger train that includes one or more locomotives coupled to one or more passenger cars. The rail vehicle 100 includes an engine system 106. The engine system 106 may be operable to generate electrical power for distribution to various components, modules, cars, etc. that may be remotely located from the engine system 106.

In one example, the rail vehicle 100 is a diesel-electric vehicle. For example, the engine system 106 includes a diesel engine 108 that generates a torque output on a drive shaft 112 that is transmitted to an electrical power generation unit 114. In some embodiments, the engine 108 is a four-stroke engine in which each of the cylinders fires in a firing order during two revolutions of the drive shaft 112. In other embodiments, the engine 108 is a two-stroke engine in which each of the cylinders fires in a firing order during one revolution of the drive shaft 112.

The electrical power generation unit 114 produces electrical power that is applied for subsequent propagation to a variety of downstream electrical components. The electrical power generation unit 114 includes a traction alternator 116 and a HEP alternator 118. In other embodiments, the electrical power generation unit 114 may additionally include an auxiliary alternator 120. As described herein, the alternators of the electrical power generation unit 114 may also be referred to individually as power distribution units, power systems, or power circuits. Each of the traction alternator 116, the HEP alternator 118, and the auxiliary alternator 120 (if present) are coupled to the drive shaft 112 to convert torque output from the engine 108 into electrical power to be distributed to various components.

In the illustrated embodiment, the traction alternator 116, the HEP alternator 118, and the auxiliary alternator 120 are positioned in the same physical housing of the electrical power generation unit 114. However, it will be appreciated that in some embodiments, one or more of the alternators may be located elsewhere in the rail vehicle. For example, in some embodiments, the engine system of the rail vehicle may include a second engine and one or more of the alternators may be coupled to a drive shaft of the second engine.

The traction alternator 116 provides electrical power to a plurality of traction motors 110. As depicted, the plurality of traction motors 110 are each connected to one of a plurality of wheels 104 to provide tractive power to propel the rail vehicle 100. One example of a rail vehicle configuration includes one traction motor per wheel pair (axle). As depicted herein, six traction motors correspond to each of six pairs of wheels of the rail vehicle. The traction alternator 116 and associated electronic components will be discussed in further detail below with reference to FIG. 2.

The HEP alternator 118 provides electrical power to a plurality of rail cars 136 coupled to the rail vehicle 100 through a contactor 122. In one example, the plurality of rail cars includes unpowered cars, such as passenger cars, dining cars, etc. ("Unpowered" may include incapable of self-propulsion and/or lacking on-board functionality for generating electricity.) For example, electrical power provided by the HEP alternator 118 may supply the lighting, HVAC, dining car kitchen, battery charging loads, and/or other hotel needs of connected rail cars. In another example, the unpowered cars use the electrical power provided by the HEP alternator for heating, lighting, ventilation, air conditioning, communication equipment, entertainment devices, fans, outlets/sockets, and/or kitchen equipment.

In some embodiments, the vehicle system is one of a plurality of vehicles coupled together and the HEP alternator provides power to some or all of the plurality of coupled vehicles. In one example, the vehicle system is a locomotive, e.g., one of a plurality of locomotives in a consist. As another example, the vehicle system is a generator car, e.g., one of a plurality of generator cars in a consist. In such embodiments, a HEP load may be balanced between the vehicle system and the plurality of rail cars coupled to the vehicle system. In one example, the HEP load is balanced between the vehicle system and the plurality of rail cars to maintain a designated horse power (power rating) and/or a fuel consumption rate. In one example, the HEP load may be in a range from about 20 kW to more than 150 kW, or up to 560 kW. In other examples, the HEP load may have a voltage range from 800 V to 1000 V AC/DC two pole (400 or 600 A), 1500 V AC two pole (800 A) or at 415 V three-phase, 380 V three-phase, three-phase AC at 480 V, or switchable between voltages: e.g., 1,000 V AC 16⅔ Hz, 1,500 V AC 50 Hz, 1,500 V DC and 3,000 V DC. In one particular example, the HEP alternator supplies three-phase AC electrical power at 480 V and 60 Hz. In some embodiments, transformers may be fitted in each rail car to lower voltages for consumption by various onboard devices. The HEP alternator 118 and associated electronic components will be discussed in further detail below with reference to FIG. 2.

The auxiliary alternator 120 provides electrical power to one or more auxiliary components 124 of the engine system 106. For example, an auxiliary component may include a radiator fan, an alternator blower, an inverter blower, a resistive grid blower, a cooling tower blower, or another component associated with operation of the engine system 106.

An energy storage system 138 may be coupled to the electrical power generation unit 114. The energy storage system 138 may be operable to receive power from any of the alternators in the electrical power generation unit and provide power to any of the power distribution systems associated with the alternators. In one example, the energy storage system 138 may be operable to receive power from the HEP alternator 118 when available, and provide power to an electrical component coupled to the HEP alternator when the HEP alternator does not provide power to the electrical component. In one example, the HEP alternator may not provide power to the electrical component because the power may be provided to traction motors or may be used elsewhere. For example, the electrical component may include one or more of the plurality of cars coupled to the HEP alternator, or an auxiliary blower or other component coupled to a HEP bus. It will be appreciated that energy storage system 138 may include a battery and/or another suitable power storage device.

In some embodiments, the traction motors 110 may have regenerative power producing capabilities, such as power produced during regenerative braking operations. As such, the vehicle system 100 may be configured to feed power produced during regenerative operation to the HEP system, under some conditions. In particular, regenerative power may be provided to the HEP bus to meet a HEP load.

In some embodiments, the vehicle system 100 includes a pantograph 140 that is coupled to an overhead power line 142. The pantograph 140 collects power from the overhead power line 142 when available to be used for various operations. The pantograph 140 is coupled to the power generation unit 114 to provide power to the various power systems including the HEP system. In one example, the pantograph 140 is operable to provide power to a hotel load on a HEP bus when available. Further, the HEP alternator is operable to provide power to the hotel load when the pantograph does not provide power to the hotel load.

The controller 126 at least partially controls operation of the rail vehicle 100 and the engine system 106. The controller 126 includes a microprocessor unit (e.g., a processor) 128 and an electronic storage medium (a.k.a., a computer-readable storage medium) 130. For example, the computer-readable storage medium includes one or more of a read-only memory chip, random access memory, etc. The computer readable storage medium 130 holds instructions that when executed by the microprocessor unit 128 executes programs for controlling operation of the engine system 106 as well as methods discussed in further detail below with reference to FIG. 7. The controller 126, while overseeing control and management of the vehicle system 100, is configured to receive signals from a variety of engine sensors 132 in order to determine operating parameters and operating conditions, and correspondingly adjust various actuators 134 to control operation of the rail vehicle 100.

In one embodiment, the controller 126 is configured to operate the engine to generate a torque output on the drive shaft coupled to the traction alternator and the HEP alternator. The controller 126 is further configured to vary a first excitation power provided to the traction alternator to provide a first output power to one or more traction motors based on an electrical load on the traction alternator and the torque output. The excitation power is provided by power electronics positioned external to the traction alternator. The controller 126 is further configured to excite the HEP alternator with a second excitation power to provide a second output power to one or more rail cars of the rail vehicle based on the torque output, wherein the excitation power is provided by a self-excited field winding positioned in the HEP alternator. In one example the output power provided by the HEP alternator to the rail cars is substantially constant.

In one embodiment, the controller 126 is configured to monitor a car-to-car integrity of a HEP power line (e.g., HEP power bus) and report if there is a short circuit or an indication of degradation of the HEP power line. In one embodiment, the sensors 132 may include a monitoring circuit, switch, or other device that is coupled to the HEP power line between the contactor 260 and each of the rail cars 136 (or another location). The monitoring circuit may detect occurrence of a short circuit between the contactor and the rail cars and correspondingly may send a signal to the controller 126 indicating the short circuit. Further, in one embodiment, the controller 126 is configured to provide an indication (e.g., audio or visual) to a vehicle operator in response to detection of the short circuit. In one embodiment, the controller 126 is configured to adjust operation based on detection of the short circuit. In one embodiment, the controller 126 is configured to shut off electrical components, such as appliances in the rail car where the short circuit was detected. In one embodiment, the controller 126 is configured to reroute power from another source or connection to the rail car where the short circuit was detected. A short circuit is one example, of various degradation conditions that may be detected by the controller 126. A degradation condition includes a condition where the HEP power line does not provide power as commanded by the controller 126.

In one embodiment, the controller 126 is configured to supplement power provided to the one or more traction motors by the traction alternator with power provided by the HEP alternator on demand. So, for example, the controller may be configured to control transfer of power from the HEP alternator to the one or more traction motors when, in a given time period, the traction alternator is unable to meet the total power demand of the one or more traction motors. In one embodiment, the controller 126 is configured to turn off one or more electrical components that receive power from the HEP alternator based on a designated hierarchy to provide power to the one or more traction motors on demand. For example, the hierarchy may include turning off an oven first, followed by various other components, and emergency lights may be turned off last. That is, the hierarchy may include turning off non-critical loads first, and safety-critical loads last.

In one embodiment, the controller 126 is configured to control the HEP alternator to provide an amount of power to one or more unpowered cars coupled to the vehicle system based on engine load and/or an emission rate threshold. Under some conditions, power may be provided to the traction system in favor of the HEP system based on operating conditions. In one embodiment, when a rail vehicle is under high engine load, such as during a hill climb, the controller 126 is configured to divert power from the HEP system to the traction system in order to power the traction motors to propel the rail vehicle up the hill. In one embodiment, when a rail vehicle produces emissions at a rate above a threshold, such during operation in a tunnel, the controller 126 is configured to de-rate the engine system due based on the emissions rate. Further, the controller 126 is configured to diver power from the HEP system to the traction system in order to compensate for the engine de-ration and meet the engine load.

Figure 2:
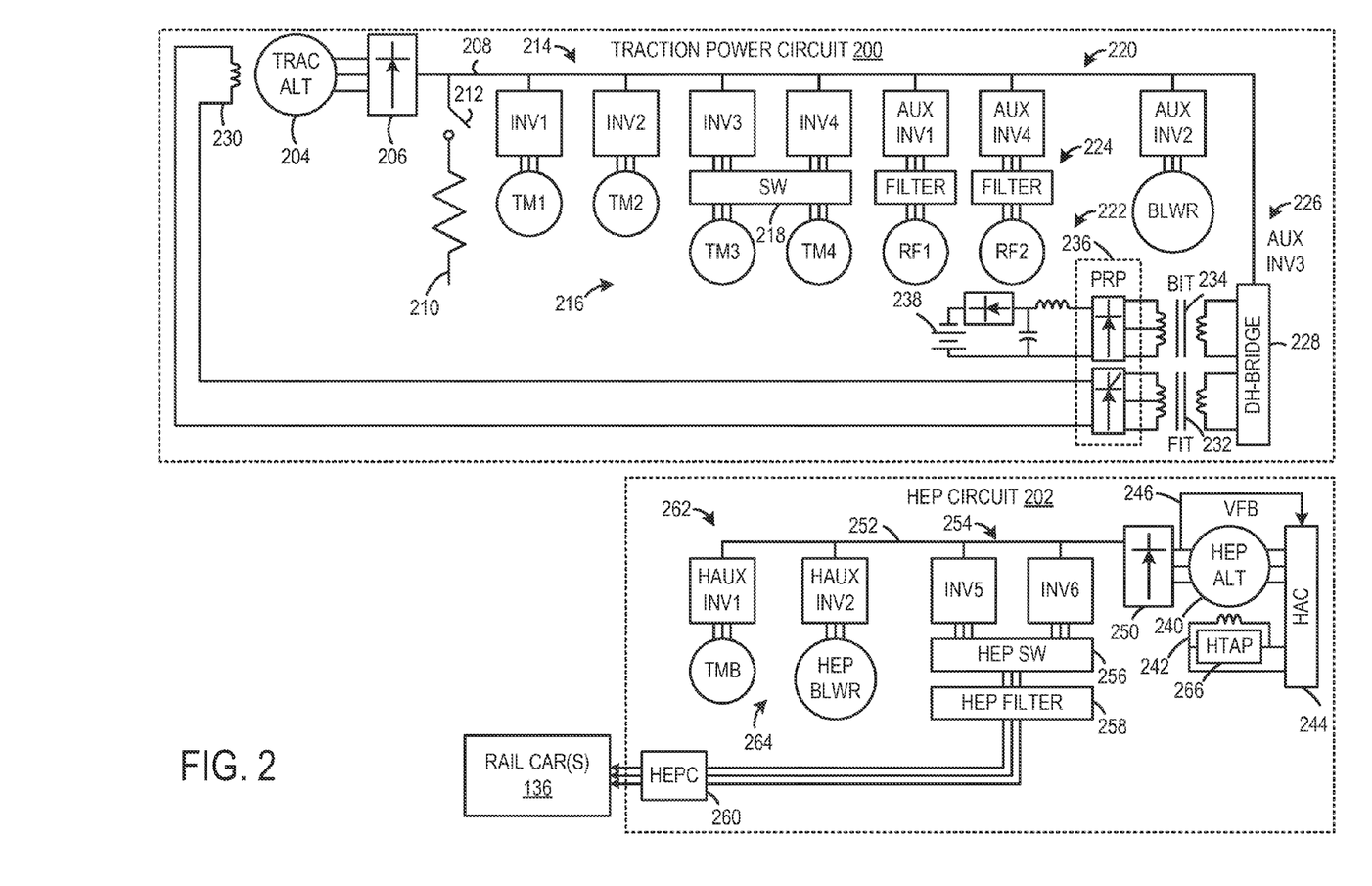
FIG. 2 shows a schematic diagram of an embodiment of a traction power circuit and a head-end-power (HEP) circuit.

FIG. 2 shows a schematic diagram of an embodiment of a traction power circuit 200 and a HEP circuit 202. In one example, the traction power circuit 200 corresponds to the traction alternator 116 and the HEP circuit 202 corresponds to the HEP alternator 118 in the electrical power generation unit 114 of the rail vehicle 100 shown in FIG. 1.

The traction power circuit 200 includes a traction alternator 204 (TRAC ALT) operable to produce three-phase alternating current (AC) electrical power. The AC power may be generated based on a torque output produced by the engine 108 (shown in FIG. 1) and/or a field current of the traction alternator 204. The field current is an electric current that is applied to one or more field windings 230 that are powered by externally positioned power electronics 226. Externally positioned means that the power electronics are not in the traction alternator or are separate from the traction alternator. The field current provided by the power electronics 226 generates a magnetic field or flux of the traction alternator 204. A rotor of the traction alternator 204 rotates within the magnetic field to generate the electrical power (e.g., current and/or voltage) that is output from the traction alternator 204.

The traction alternator 204 is coupled to a rectifier 206 that is operable to convert the AC power into direct current (DC) electrical power. The DC power output by the rectifier 206 is provided to various electrical components through a traction bus 208. An electrical load 210 is coupled to the traction bus 208 by a switch 212 that allows the electrical load to be disconnected from the traction bus 208 based on operating conditions of the rail vehicle. The electrical load 210 is representative of different components that apply electrical loads to the traction bus 208 that vary throughout operation of the rail vehicle. For example, the electrical load 210 may include one or more of dynamic brakes, resistive grids, engine blowers, and other electrical components that provide or consume electrical power on the traction bus 208. The various electric loads described herein are not intended to be all encompassing or exclusive, as additional components may be included.

A plurality of traction inverters (INV1-INV4) 214 is coupled to the traction bus 208. The plurality of traction inverters 214 may be configured to modify the electrical power received from the traction bus 208 to a suitable form to be provided to a plurality of traction motors (TM1-TM4) 216.

In particular, the plurality of inverters 214 convert DC power to AC power, among other modifications, to drive the plurality of traction motors 216.

A crank transfer switch 218 (SW) is positioned between inverters INV3 and INV4 and traction motors TM3 and TM4 to control the supply of current to the traction motors during propulsion of the rail vehicle and to supply the traction alternator 204 with current during startup to crank the engine.

A plurality of auxiliary inverters (AUXINV1-AUXINV4) 220 is coupled to the traction bus 208. The plurality of auxiliary inverters 220 may be configured to modify the electrical power received from the traction bus 208 to a suitable form to be provided to a plurality of auxiliary components 222. For example, the auxiliary inverters AUXINV1 and AUXINV4 convert the DC power of the traction bus 208 into AC power that is delivered to filters 224. The filters 224 attenuate high voltages above a predetermined level that permit the use of random would motors (e.g., induction or otherwise) to power the auxiliary components. Without such filters, high voltages generated by the auxiliary inverter switching in combination with long cable lengths could damage the random wound motor insulation. The AC power that is output from the filters 224 is delivered to radiator fans RF1 and RF2 that blow air to cool a radiator or other component of the engine 108 (shown in FIG. 1).

Furthermore, the auxiliary inverter AUXINV2 provides AC power to a blower BLWR that blows air to cool the traction alternator and the plurality of inverters coupled to the traction bus 208. It will be appreciated that additional inverters, filters, and/or other propulsion electric loads may be joined to the traction bus to draw current from the traction bus. For example, the additional electric loads may be fans, blowers, compressors, electronic devices, traction motors, and the like.

Power electronics 226 are disposed between the traction bus 208 and field windings 230 of the traction alternator 204. The power electronics 226 include a dual H-bridge 228 (DH-BRIDGE) that is coupled to a field isolation transformer (FIT) 233 and a battery isolation transformer (BIT) 234. The FIT 232 and the BIT 234 isolate the dual H-bridge 228 from the field windings 230 and a battery 238. The FIT 232 and the BIT 234 are coupled to a power rectifier panel (PRP) 236. The FIT 232 provides electrical power to the field windings 230. The BIT 234 provides electrical power to the battery 238. The battery 238 may receive and store electric current from the traction bus 208. The battery 238 also may deliver electric current through the traction bus 208 when the traction alternator 204 does not generate current. For example, the battery 238 may supply electric current when the engine 108 (shown in FIG. 1) is turned off or deactivated.

The dual H-bridge 228 controls the field current that is supplied to the field windings 230 of the traction alternator 204 through the FIT 232 to control an excitation power level provided to the traction alternator. For example, the dual H-bridge 228 may increase the voltage applied to the field windings 230 to increase the magnetic field created by the field windings 230 and the voltage that is output from the traction alternator 204. Likewise the dual H-bridge 228 may decrease the voltage supplied to the field windings 230 to decrease the output voltage of the traction alternator 204. The dual H-bridge 228 is operable to vary the voltage that is delivered to the field windings 230 based on the load on the traction bus 208 and the torque output of the engine 108 (shown in FIG. 1), among other parameters. For example, the dual H-bridge 228 may increase the voltage of the field current when the engine 108 slows down to meet the load on the traction bus and may decrease the voltage of the field current when the engine 108 speeds up to meet the load on the traction bus. In some embodiments, the engine 108 may be operated at a substantially constant speed or to provide a substantially constant torque output. Accordingly, the dual H-bridge 228 may vary the voltage of the field current as the load on the traction bus 208 varies.

Due to the variance in load (e.g., from the traction motors) on the traction bus 208 at any given time, the traction bus 208 may have a large voltage range capability. For example, the voltage on the traction bus may range from 330V-1400V throughout operation of the rail vehicle. Moreover, the power electronics 226 are configured to control vary the voltage provided to the field windings 230 to control the traction alternator to output electrical power to meet the voltage range of the traction bus.

The HEP circuit 202 includes a HEP alternator 240 (HEP ALT) operable to produce three-phase AC electrical power to one or more rail cars 136 of the rail vehicle 100. The AC power may be generated based on a torque output produced by the engine 108 (shown in FIG. 1) and/or a field current of the HEP alternator 240. The field current is an electric current that provided by one or more excitation field windings 242 positioned in the HEP alternator 240 in what may be referred to as self excitation. Power output from a rotor of the HEP alternator 240 is used to power the excitation field windings 242 in the HEP alternator 240. In some embodiments, an alternator protection panel 266 (HTAP) is coupled to the field windings 242. The alternator protection panel 266 protects the HEP alternator 240 against power overload in case of a rectifier or diode failure in the HEP system.

The excitation field windings 242 may take various forms that are capable of self excitation from within the HEP alternator. Examples of excitation field windings used for self-excitation of the HEP alternator will be discussed in further detail below with reference to FIGS. 3-6.

In the illustrated embodiment, since the HEP alternator 240 is self excited, the HEP alternator does not receive electrical power from permanent magnets, and/or external power electronics for excitation. However, it will be appreciated that in some embodiments the HEP circuit 202 may include such components. For example, the HEP alternator may be initially flashed with a battery to start the self excitation process, and then the battery may be disconnected during HEP system operation.

A HEP alternator controller (HAC) 244 is coupled to the HEP alternator 240. The HAC 244 is configured to vary voltage provided to the field windings 242 once the HEP alternator has been excited to full voltage based on voltage feedback (VFB) output from the HEP alternator 240. The HAC 244 varies voltage to the excitation field winding 242 so that the HEP alternator 240 outputs substantially constant voltage for distribution to the rail cars. Relative to the external power electronics 226 that control the traction alternator 204, the HAC 244 provides less complex feedback control. Moreover, the HAC 244 is less expensive, weighs less, and does not require as much cooling resources as the power electronics 226. The HEP alternator 240 may be controlled by the HAC instead of the larger and more expensive power electronics 226 of the traction power circuit 200, because the HEP alternator 240 is self excited and outputs a substantially constant voltage that is distributed through a HEP bus 252 that has a voltage range that is less than the voltage range of the traction bus 208.

The HEP alternator 240 is coupled to a rectifier 250 that is operable to convert the AC power into DC power that is provided to various electrical components through the HEP bus 252. A plurality of HEP inverters (INV5-INV6) 254 is coupled to the HEP bus 252. The plurality of HEP inverters 254 may be configured to modify the electrical power received from the HEP bus 252 to a suitable form to be provided to the rail cars 136 of the rail vehicle 100. In particular, the plurality of inverters 254 converts DC power to AC power, among other modifications. A HEP transfer switch 256 (HEP SW) is positioned between inverters INV5 and INV6 to control the supply of current to the rail cars 136 of the rail vehicle 100. A HEP filter 258 is coupled to the HEP transfer switch 256. The HEP filter 258 reduces current that does not have a predetermined frequency or a frequency that falls outside a predetermined range of frequencies. For example, the HEP filter 258 may filter out non-60 Hz components or harmonics of the AC power that is output from the switch 256. The AC power output from the HEP filter 258 is distributed to the rail cars 136 through a HEP contactor 260 (HEPC). In one example, the AC power is supplied to the rail cars 136 as three-phase AC at 480 volts and 60 Hz.

A plurality of HEP auxiliary inverters (HAUXINV1 and HAUXINV2) 262 is coupled to the HEP bus 252. The plurality of HEP auxiliary inverters 262 may be configured to modify the electrical power received from the HEP bus 252 to a suitable form to be provided to a plurality of auxiliary components 264. For example, the auxiliary inverters HAUXINV1 and HAUXINV2 convert the DC power of the HEP bus 252 into AC power that is delivered to blowers for cooling the traction motors and the HEP alternator. It will be appreciated that additional inverters, filters, and/or other electric loads may be joined to the HEP bus to draw current from the HEP bus. For example, the additional electric loads may be fans, blowers, compressors, electronic devices, and the like.

Figure 3:
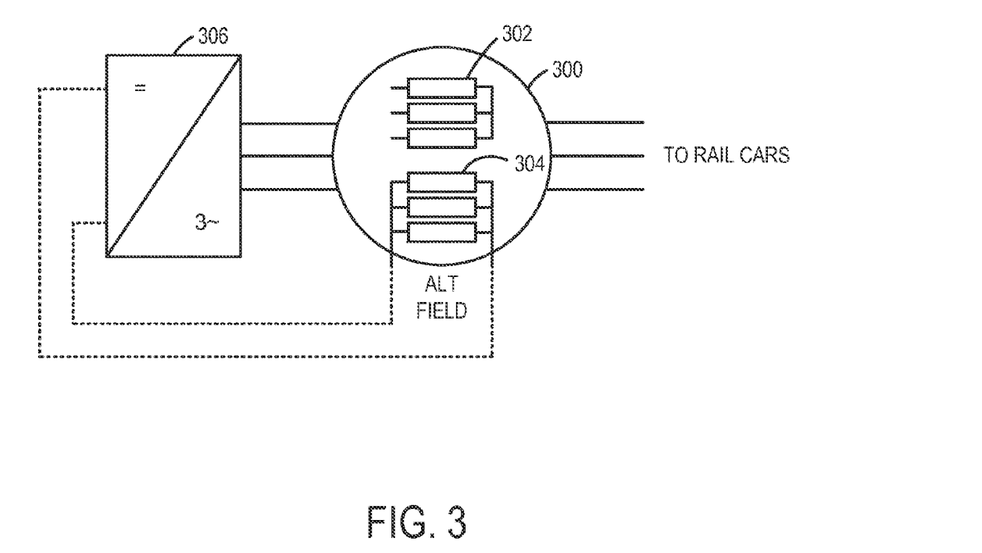
FIGS. 3-6 show different embodiments of a self-excited HEP alternator that may be employed in a HEP circuit according to the present disclosure.

FIGS. 3-6 show different embodiments of a self-excited HEP alternator that may be employed in the HEP circuit 202 shown in FIG. 2. FIG. 3 shows a HEP alternator 300 including a three phase output winding 302 that provides electrical power output from the HEP alternator 300. The HEP alternator 300 further includes a three-phase exciter winding 304 that is physically separate from the three-phase output winding 302. The exciter winding 304 may be wrapped along with the output winding 302 around the stator in the HEP alternator 300 such that the output winding 302 and the exciter winding 304 receive the same flux. The exciter winding provides three-phase voltage to a phase control rectifier 306. The rectifier 306 provides a field voltage to generate a field current in the HEP alternator 300 to make it self-excited.

Figure 4:
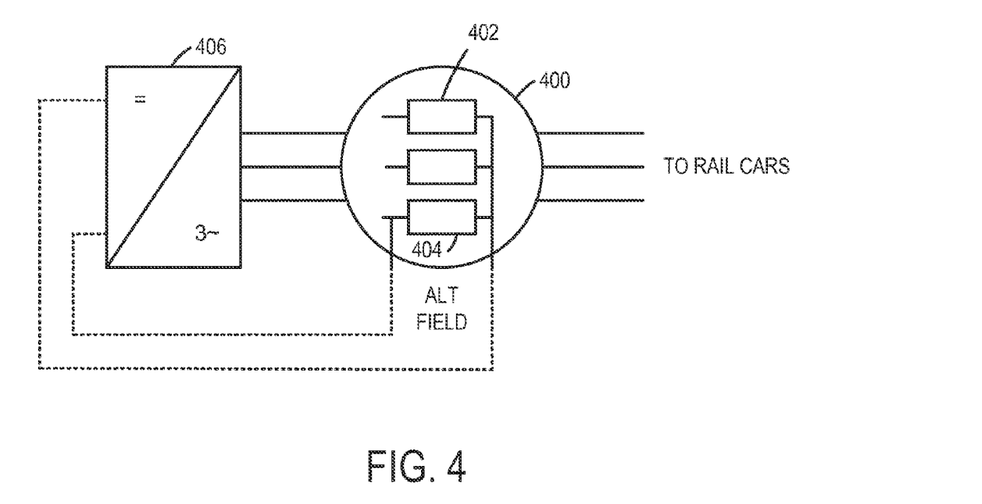

FIG. 4 shows a HEP alternator 400 including a three phase output winding 402 that provides electrical power output from the HEP alternator 400. Further, a portion 404 of the output winding 402 acts as an exciter field winding. In particular, the portion 404 of the output winding 402 is tapped to provide an excitation power level that is less than an output power level of the HEP alternator 400. The portion 404 of the output winding 402 that acts as the exciter winding provides three-phase excitation voltage or field voltage (ALT FIELD) to a phase control rectifier 406. The rectifier 406 provides field voltage to generate a field current in the HEP alternator 400 to make it self-excited. In one example, the portion 404 of the output winding 402 that is tapped to provide the field voltage is ⅓ of the output winding 402. In another example, the portion 404 of the output winding 402 that is tapped to provide the field voltage is ⅙ of the output winding 402. It will be appreciated that any suitable portion of the output winding may be tapped to provide an appropriate field voltage for self excitation.

Figure 5:
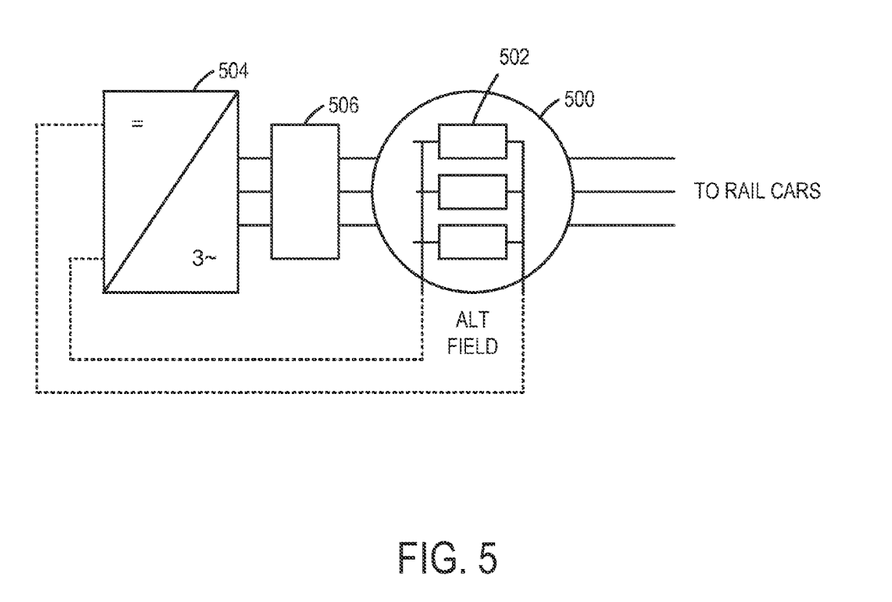

FIG. 5 shows a HEP alternator 500 including a three phase output winding 502 that provides electrical power output from the HEP alternator 500. Further, the output winding 402 acts as the exciter winding by providing three-phase excitation voltage or field voltage (ALT FIELD) to a phase control rectifier 504. The rectifier provides a field voltage to a transformer 506. The transformer 506 is operable to modify the field voltage from the rectifier 504 to generate a field current in the HEP alternator 500 to make it self-excited. In other words, the transformer 506 provides an excitation power level that is less than an output power level of the HEP alternator 500 to the HEP alternator 500 for self excitation.

Figure 6:
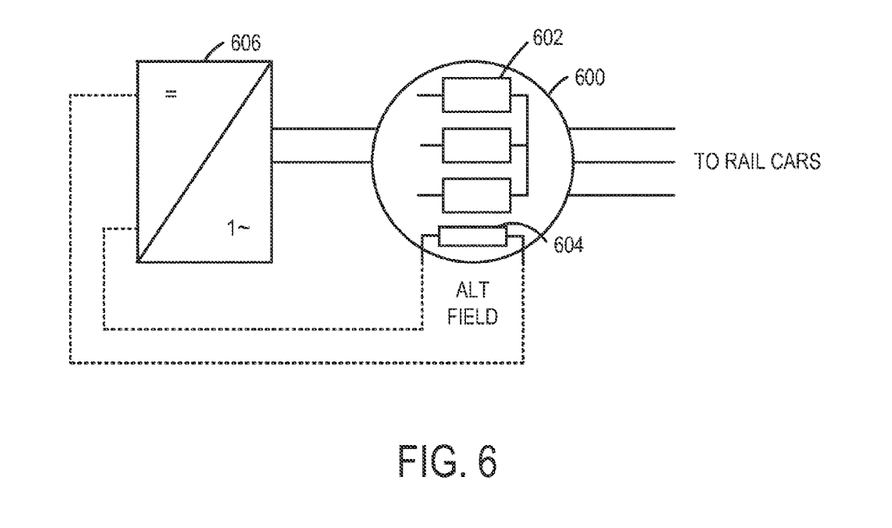

FIG. 6 shows a HEP alternator 600 including a three phase output winding 602 that provides electrical power output from the HEP alternator 600. The HEP alternator 600 further includes a single-phase exciter winding 604 that is physically separate from the three-phase output winding 602. The exciter winding 604 may be wrapped along with the output winding 602 around the stator in the HEP alternator 600 such that the output winding 602 and the exciter winding 604 receive the same flux. The exciter winding provides single-phase excitation voltage or field voltage (ALT FIELD) to a phase control rectifier 606. The rectifier 606 provides a field voltage to generate a field current in the HEP alternator 600 to make it self-excited.

Figure 7:
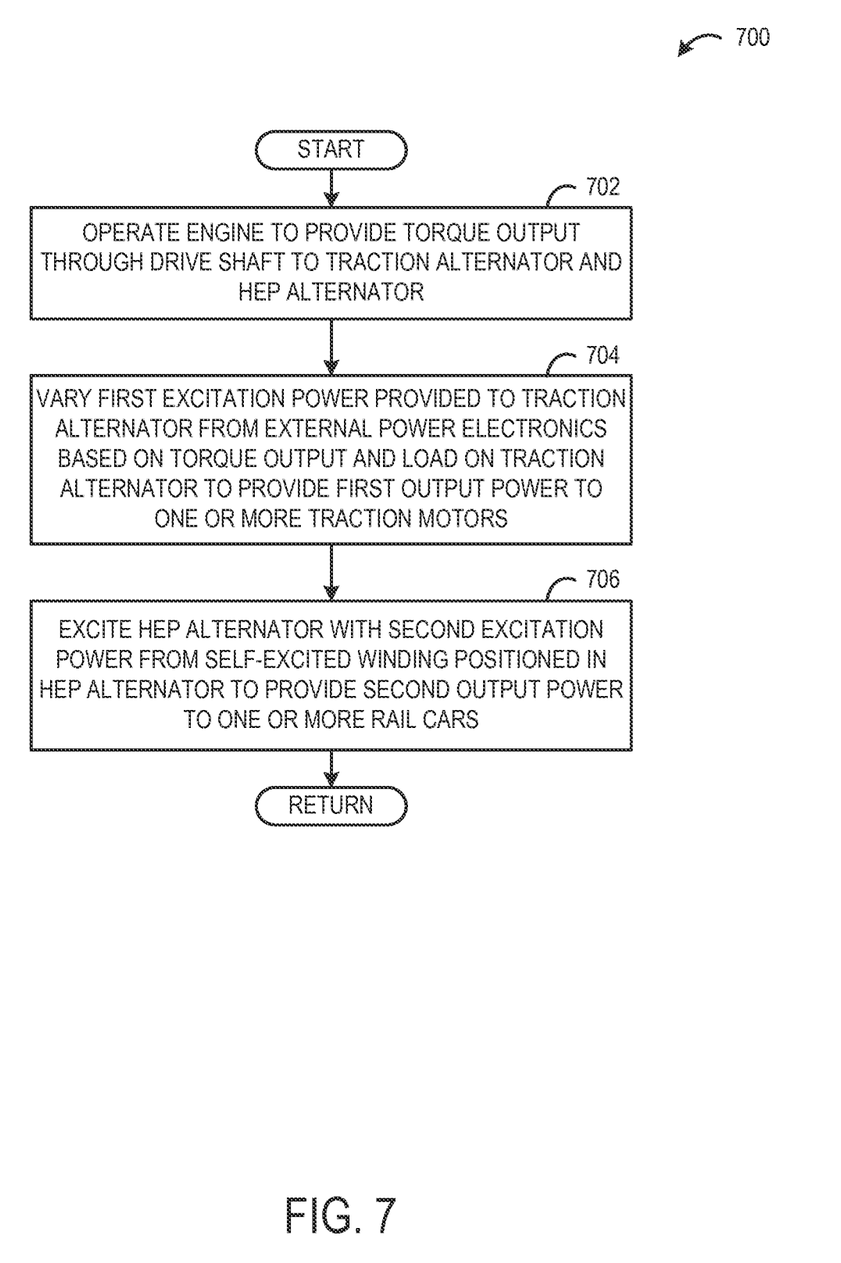
FIG. 7 shows a flow chart of an embodiment of a method for controlling a HEP electrical system.

FIG. 7 shows a flow chart of an embodiment of a method 700 for generating power in a rail vehicle. In one example, the method 700 is executed by the controller 126 in FIG. 1, and more particularly the dual H-bridge 228 and the HAC 244 shown in FIG. 2. At 702, the method 700 includes operating an engine to generate a torque output on a drive shaft coupled to a traction alternator and a HEP alternator. In some embodiments, the method includes maintaining a substantially constant torque output on the drive shaft provided by the engine.

At 704, the method 700 includes varying a first excitation power provided to the traction alternator to provide a first output power to one or more traction motors based on an electrical load on the traction alternator and the torque output. The excitation power is provided by power electronics positioned external to the traction alternator. In one example, the power electronics include a dual H-bridge coupled to a field isolation transformer that provides power to a field winding of the traction alternator. For example, the load on the traction alternator may be based on the amount of power consumed by electrical components coupled to a traction bus to which the traction alternator provides output power.

At 706, the method 700 includes exciting the HEP alternator with a second excitation power to provide a second output power to one or more rail cars of the rail vehicle based on the torque output. The excitation power is provided by a self-excited field winding positioned in the HEP alternator. In some embodiments, the method includes maintaining a substantially constant output power provided by the HEP alternator to the rail cars.

By employing a self-excited HEP alternator, external power electronics that would otherwise be required to excite the alternator may be eliminated from the rail vehicle, in one example. For example, the HEP alternator may not receive electrical power from a battery for excitation. As another example, the HEP alternator may not receive electrical power from permanent magnets for excitation. In this way, the HEP alternator may be made more compact and light weight relative to a configuration where a HEP alternator is excited by external power electronics.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A vehicle system, comprising:
   an electrical power generation unit operatively coupled with at least one drive shaft of an engine system, the electrical power generation unit comprising:
      a traction alternator excited by power electronics positioned external to the traction alternator, the power electronics including a field isolation transformer and a dual H-bridge coupled to the field isolation transformer to control an excitation power level provided to the traction alternator; and
      a head-end-power (HEP) alternator, wherein the HEP alternator is self-excited by an exciter winding positioned in the HEP alternator.

2. The vehicle system of claim 1, further comprising:
   one or more traction motors, wherein the traction alternator is coupled to a first drive shaft of the at least one drive shaft, and wherein the traction alternator is operable to provide electrical power to the one or more traction motors to propel the vehicle system.

3. The vehicle system of claim 2, wherein the HEP alternator is coupled to the first drive shaft, and wherein the HEP alternator is operable to provide electrical power to one or more unpowered cars coupled to the vehicle system.

4. The vehicle system of claim 3, wherein the traction alternator is operable to provide electrical power to the one or more traction motors through a first traction bus having a first voltage range and the HEP alternator is operable to provide electrical power to the one or more unpowered cars through a second traction bus that has a second voltage range that is less than the first voltage range.

5. The vehicle system of claim 4, wherein the unpowered cars are operative to use the electrical power for one or more of heating, lighting, ventilation, air conditioning, communication equipment, entertainment devices, fans, outlets/sockets, or kitchen equipment.

6. The vehicle system of claim 3, further comprising:
   a controller configured to monitor a car-to-car integrity of a HEP power line and report if there is a short circuit or an indication of degradation of the HEP power line.

7. The vehicle system of claim 2, further comprising:
   a controller configured to supplement power provided to the one or more traction motors by the traction alternator with power provided by the HEP alternator on demand.

8. The vehicle system of claim 7, wherein the controller is configured to turn off one or more electrical components that receive power from the HEP alternator based on a designated hierarchy to provide power to the one or more traction motors on demand.

9. The vehicle system of claim 1, further comprising:
   a pantograph operable to provide power to a hotel load when available, and wherein the HEP alternator is operable to provide power to the hotel load when the pantograph does not provide power to the hotel load.

10. The vehicle system of claim 1, wherein the electrical power generation unit further comprises an auxiliary alternator coupled to the drive shaft, and wherein the auxiliary alternator is operable to provide power to an auxiliary component of the vehicle system.

11. The vehicle system of claim 1, further comprising:
    an energy storage system operable to receive power from the HEP alternator when available, and provide power to an electrical component when the HEP alternator does not provide power to the electrical component.

12. The vehicle system of claim 1, further comprising:
    a controller configured to control the HEP alternator to provide an amount of power to one or more unpowered cars coupled to the vehicle system based on engine load and an emission rate threshold.

13. The vehicle system of claim 1, further comprising:
    a controller configured to balance an HEP load between the vehicle system and a plurality of rail cars coupled to the vehicle system to maintain a designated horse power and/or a fuel consumption rate.

14. The vehicle system of claim 1, wherein the exciter winding is a portion of a three-phase output winding that provides electrical power output from the HEP alternator, wherein the portion of the three-phase output winding is tapped to provide an excitation power level that is less than an output power level of the HEP alternator.

15. The vehicle system of claim 1, wherein the exciter winding includes a three-phase output winding that provides electrical power output from the HEP alternator, wherein the three-phase output winding is coupled to a transformer that is operable to provide an excitation power level that is less than an output power level of the HEP alternator.

16. The vehicle system of claim 1, wherein the dual H-bridge is further coupled to a battery isolation transformer to control a power level provided to a battery coupled to the battery isolation transformer.

17. A vehicle system, comprising:
    an electrical power generation unit operatively coupled with at least one drive shaft of an engine system, the electrical power generation unit comprising:
       a traction alternator excited by power electronics positioned external to the traction alternator; and
       a head-end-power (HEP) alternator, wherein the HEP alternator is self-excited by an exciter winding positioned in the HEP alternator, the exciter winding comprising one or more exciter windings that are physically separate from a three-phase output winding that provides electrical power output from the HEP alternator.

18. The vehicle system of claim 17, wherein the one or more exciter windings and the three-phase output winding are wrapped around a stator in the HEP alternator, and wherein the one or more exciter windings provide a voltage to a rectifier, the rectifier providing a field voltage to generate a field current in the HEP alternator.

19. A rail vehicle system, comprising:
an electrical power generation unit operatively coupled with a drive shaft of an engine, the electrical power generation unit comprising:
- a traction alternator coupled to the drive shaft, the traction alternator being operable to provide electrical power for one or more traction motors to propel the rail vehicle system, wherein the traction alternator is excited by a field isolation transformer that is controlled by a dual H-bridge to vary an excitation power level provided to the traction alternator; and
- a head-end-power (HEP) alternator coupled to the drive shaft, the HEP alternator being operable to provide electrical power to one or more rail cars of the rail vehicle system, wherein the HEP alternator is self-excited by an exciter winding positioned in the HEP alternator.

20. A method comprising:

operating an engine in a rail vehicle to generate a torque output on a drive shaft coupled to a traction alternator and a head-end-power (HEP) alternator;

varying a first excitation power provided to the traction alternator to provide a first output power to one or more traction motors based on an electrical load on the traction alternator and the torque output, wherein the first excitation power is provided by power electronics positioned external to the traction alternator; and exciting the HEP alternator with a second excitation power to provide a second output power to one or more additional rail vehicles coupled to the rail vehicle based on the torque output, wherein the second excitation power is provided by a self-excited field winding positioned in the HEP alternator.

* * * * *